US012788648B2

(12) United States Patent
Mansfield et al.

(10) Patent No.: US 12,788,648 B2
(45) **Date of Patent: *Nov. 10, 2026**

(54) PATIENT SUPPORT APPARATUS WITH HYDRAULIC OSCILLATION DAMPENING

(71) Applicant: Stryker Corporation, Kalamazoo, MI (US)

(72) Inventors: Joshua Alan Mansfield, Lawton, MI (US); Craig Lear, St. Joseph, MI (US); Ross Timothy Lucas, Paw Paw, MI (US)

(73) Assignee: Stryker Corporation, Portage, MI (US)

( * ) Notice: Subject to any disclaimer, the term of this patent is extended or adjusted under 35 U.S.C. 154(b) by 138 days.

This patent is subject to a terminal disclaimer.

(21) Appl. No.: 18/811,920

(22) Filed: Aug. 22, 2024

(65) Prior Publication Data

US 2024/0407960 A1 Dec. 12, 2024

Related U.S. Application Data

(63) Continuation of application No. 18/215,544, filed on Jun. 28, 2023, now Pat. No. 12,090,104, which is a (Continued)

(51) Int. Cl.
*A61G 7/018* (2006.01)
*A61G 1/02* (2006.01)
(Continued)

(52) U.S. Cl.
CPC ............ *A61G 7/018* (2013.01); *A61G 7/012* (2013.01); *A61G 7/1073* (2013.01);
(Continued)

(58) Field of Classification Search
CPC ...... A61G 7/10; A61G 7/1036; A61G 7/1046; A61G 7/018; A61G 7/012; A61G 7/1073;
(Continued)

(56) References Cited

U.S. PATENT DOCUMENTS 3,530,514 A 9/1970 Mccalley
3,627,377 A 12/1971 Pickles
(Continued)

FOREIGN PATENT DOCUMENTS

AU 7200700 A 6/2001
DE 3313843 A1 10/1984
(Continued)

OTHER PUBLICATIONS

English language abstract and machine-assisted English translation for DE 33 13 843 A1 extracted from espacenet.com database on Nov. 7, 2022, 10 pages.
(Continued)

*Primary Examiner* — David R Hare
*Assistant Examiner* — Deborah Talitha Gedeon
(74) *Attorney, Agent, or Firm* — Howard & Howard Attorneys PLLC

(57) ABSTRACT

A patient transport apparatus with a base, a litter comprising a support surface, and a lift mechanism to facilitate arranging the litter at different heights relative to the base between a plurality of lift configurations including a fully-retracted configuration and a fully-extended configuration. The lift mechanism includes an actuator including a cylinder, fluid reservoir, and a pump driven by a motor to direct hydraulic fluid from the fluid reservoir to the cylinder. A sensor outputs a signal indicative of a magnitude of pressure in the cylinder. A user interface with an input control is provided. A controller determines a target parameter for the motor and, in response to user engagement with the input control, drives the motor at the target parameter to effect movement of the litter relative to the base at a predetermined rate irrespective of a weight of a patient supported on the litter.

20 Claims, 12 Drawing Sheets

Related U.S. Application Data continuation of application No. 17/132,031, filed on Dec. 23, 2020, now Pat. No. 11,730,650.

(60) Provisional application No. 62/954,861, filed on Dec. 30, 2019.

(51) Int. Cl.

| | |
|---|---|
| ***A61G 7/012*** | (2006.01) |
| ***A61G 7/08*** | (2006.01) |
| ***A61G 7/10*** | (2006.01) |

(52) U.S. Cl.
CPC .............. *A61G 1/0262* (2013.01); *A61G 7/08* (2013.01); *A61G 2203/30* (2013.01); *A61G 2203/34* (2013.01)

(58) Field of Classification Search
CPC .. A61G 7/1048; A61G 7/1049; A61G 3/0218; Y10T 137/87064; B62B 2301/25; B62B 5/0073; B62B 5/0069
See application file for complete search history.

(56) References Cited

U.S. PATENT DOCUMENTS

| | | | |
|---|---|---|---|
| 3,724,003 | A | 4/1973 | Ellwanger et al. |
| 4,078,269 | A | 3/1978 | Weipert |
| 4,747,212 | A | 5/1988 | Cavdek |
| 4,751,754 | A | 6/1988 | Bailey et al. |
| 5,102,377 | A | 4/1992 | Spanski |
| 5,161,274 | A | 11/1992 | Hayes et al. |
| 5,355,743 | A | 10/1994 | Tesar |
| 5,613,255 | A | 3/1997 | Bish et al. |
| 5,701,618 | A | 12/1997 | Brugger |
| 6,071,228 | A | 6/2000 | Speraw et al. |
| 6,289,534 | B1 | 9/2001 | Hakamiun et al. |
| 6,352,240 | B1 | 3/2002 | Eckstein et al. |
| 6,421,854 | B1 | 7/2002 | Heimbrock |
| 6,611,979 | B2 | 9/2003 | Welling et al. |
| 6,659,935 | B2 | 12/2003 | Costanzo |
| 6,886,200 | B2 | 5/2005 | Blyshak et al. |
| 7,140,055 | B2 | 11/2006 | Bishop et al. |
| 7,150,056 | B2 | 12/2006 | Lemire |
| 7,171,708 | B2 | 2/2007 | Osborne et al. |
| 7,296,312 | B2 | 11/2007 | Menkedick et al. |
| 7,398,571 | B2 | 7/2008 | Souke et al. |
| 7,441,291 | B2 | 10/2008 | Hayes et al. |
| 7,454,805 | B2 | 11/2008 | Osborne et al. |
| 7,533,429 | B2 | 5/2009 | Menkedick et al. |
| 7,610,637 | B2 | 11/2009 | Menkedick et al. |
| 7,653,954 | B2 | 2/2010 | Hornbach et al. |
| 7,694,368 | B2 | 4/2010 | Lewis, Jr. |
| 7,703,158 | B2 | 4/2010 | Wilker, Jr. et al. |
| 7,886,380 | B2 | 2/2011 | Hornbach et al. |
| 7,913,335 | B2 | 3/2011 | Carr |
| 7,926,131 | B2 | 4/2011 | Menkedick et al. |
| 8,051,513 | B2 | 11/2011 | Reed et al. |
| 8,074,309 | B2 | 12/2011 | Hutchison et al. |
| 8,104,120 | B2 | 1/2012 | Hornbach et al. |
| RE43,193 | E | 2/2012 | Osborne et al. |
| 8,151,387 | B2 | 4/2012 | Osborne et al. |
| 8,176,584 | B2 | 5/2012 | Hornbach et al. |
| 8,239,983 | B2 | 8/2012 | Chinn |
| 8,256,048 | B2 | 9/2012 | Bly et al. |
| 8,291,532 | B2 | 10/2012 | Hornbach et al. |
| 8,321,976 | B1 | 12/2012 | Edgerton |
| 8,458,833 | B2 | 6/2013 | Hornbach et al. |
| 8,502,663 | B2 | 8/2013 | Riley et al. |
| 8,607,384 | B2 | 12/2013 | Hornbach |
| 8,621,690 | B2 | 1/2014 | Hornbach et al. |
| 8,844,078 | B2 | 9/2014 | Hornbach et al. |
| 8,863,331 | B2 | 10/2014 | Valentino et al. |
| 9,138,173 | B2 | 9/2015 | Penninger et al. |
| 9,227,822 | B2 | 1/2016 | Horne |
| 9,486,373 | B2 | 11/2016 | Lambarth et al. |
| 10,898,399 | B2 | 1/2021 | Paul et al. |
| 10,987,260 | B2 | 4/2021 | Souke et al. |
| 11,730,650 | B2 | 8/2023 | Mansfield et al. |
| 2002/0178502 | A1 | 12/2002 | Beasley et al. |
| 2004/0055087 | A1 | 3/2004 | Edgerton |
| 2007/0169269 | A1 | 7/2007 | Wells |
| 2009/0165208 | A1 | 7/2009 | Reed et al. |
| 2009/0222988 | A1 | 9/2009 | Reed et al. |
| 2010/0000017 | A1 | 1/2010 | Laloge et al. |
| 2010/0199433 | A1 | 8/2010 | Clenet |
| 2012/0124746 | A1 | 5/2012 | Andrienko et al. |
| 2014/0033435 | A1 | 2/2014 | Jutras |
| 2014/0041120 | A1 | 2/2014 | Li |
| 2014/0189954 | A1 | 7/2014 | Lee |
| 2014/0325759 | A1 | 11/2014 | Bly et al. |
| 2016/0136021 | A1 | 5/2016 | Roussy et al. |
| 2016/0302985 | A1 | 10/2016 | Tessmer et al. |
| 2017/0035628 | A1 | 2/2017 | Naber et al. |
| 2017/0065474 | A1* | 3/2017 | Trepanier ............... A61G 1/042 |
| 2017/0172819 | A1 | 6/2017 | Bourgraf et al. |
| 2017/0281440 | A1* | 10/2017 | Puvogel ............... A61G 7/0527 |
| 2018/0214326 | A1 | 8/2018 | Lacasse et al. |
| 2018/0303685 | A1* | 10/2018 | Souke .................. A61G 1/0567 |
| 2019/0247254 | A1 | 8/2019 | Naber et al. |
| 2019/0247257 | A1 | 8/2019 | Furman et al. |
| 2020/0330306 | A1 | 10/2020 | Elku et al. |
| 2021/0186781 | A1 | 6/2021 | Souke et al. |
| 2021/0196542 | A1 | 7/2021 | Mansfield et al. |
| 2023/0329932 | A1 | 10/2023 | Mansfield et al. |

FOREIGN PATENT DOCUMENTS

| | | | |
|---|---|---|---|
| EP | 0364394 | A2 | 4/1990 |
| EP | 0736275 | B1 | 1/2000 |
| JP | H02156950 | A | 6/1990 |
| JP | 2016073442 | A | 5/2016 |
| KR | 20140003301 | A | 1/2014 |
| WO | 9629970 | A1 | 10/1996 |
| WO | 0117399 | A1 | 3/2001 |
| WO | 0117400 | A1 | 3/2001 |
| WO | 0123847 | A1 | 4/2001 |
| WO | 2007069912 | A1 | 6/2007 |
| WO | 2013066198 | A1 | 5/2013 |
| WO | 2014150652 | A1 | 9/2014 |
| WO | 2014191684 | A1 | 12/2014 |
| WO | 2015032003 | A1 | 3/2015 |

OTHER PUBLICATIONS

English language abstract and machine-assisted English translation for EP 0 364 394 A2 extracted from espacenet.com database on Nov. 7, 2022, 10 pages.
English language abstract and machine-assisted English translation for JPH 02-156950 A extracted from espacenet.com database on Nov. 7, 2022, 5 pages.
English language abstract and machine-assisted English translation for WO 2014/191684 A1 extracted from espacenet.com database on Nov. 7, 2022, 13 pages.
Stryker Bertec Medical Inc., "The Go Bed Electric Acute Care Bed Product No. FL17E Maintenance Manual", Dec. 2000, 64 pages.
Stryker Bertec Medical Inc., "The Go Bed Electric Acute Care Bed Product No. FL17E Operations Manual", Dec. 2000, 26 pages.
Stryker, "S3 MedSurg Bed with StayPut Frame Ref. 3005 Operations Manual", Jun. 2016, 57 pages.
U.S. Appl. No. 62/926,711, filed Oct. 28, 2019.
U.S. Appl. No. 62/926,712, filed Oct. 28, 2019.

* cited by examiner

PATIENT SUPPORT APPARATUS WITH HYDRAULIC OSCILLATION DAMPENING

CROSS-REFERENCE TO RELATED APPLICATIONS

This application is a Continuation of U.S. patent application Ser. No. 18/215,544 filed on Jun. 28, 2023, which is a Continuation of U.S. patent application Ser. No. 17/132,031 filed on Dec. 23, 2020 and issued as U.S. Pat. No. 11,730,650 on Aug. 22, 2023, which claims priority to and all the benefits of U.S. Provisional Patent Application No. 62/954,861 filed on Dec. 30, 2019, the disclosures of each of which are hereby incorporated by reference in their entirety.

BACKGROUND

Patient support apparatuses, such as hospital beds, stretchers, cots, tables, and wheelchairs, facilitate care of patients in a health care setting. For example, when a patient support apparatus, such as an emergency cot, is to be loaded into an emergency vehicle, such as an ambulance, the patient support apparatus is moved to the rear of the emergency vehicle where it is then at least partially inserted into the compartment so that it is initially supported on one end, for example, by its head end wheels resting on the compartment floor. Alternately, the cot may be moved onto a loading arm or arms, which extend from the emergency vehicle into the cot and fully support the cot, but do not interfere with the lifting mechanism. In either case, once the cot is supported (either by the head end wheels or the loading arm(s)), the base of the cot can be raised to allow the cot to then be fully loaded into the emergency vehicle.

When unloading the cot from the emergency vehicle, as the base is lowered onto the ground surface, the weight of the patient is transferred from being partially supported by the loading arms of the emergency vehicle to being fully supported by the cot. During this weight transfer, the hydraulic system of the cot may oscillate and/or vibrate due to the increase in weight supported by the cot, causing discomfort to the patient.

A weight of a patient may impact the speed at which the cot is raised or lowered. For example, a very heavy patient may cause the hydraulic system to raise the cot significantly slower than the hydraulic system would raise up the cot if a child or lighter patient was being transported. The variability in which the cot is raised or lowered depending on the weight of the patient can be irritating to medical personnel transporting the cot, especially when timing is critical.

A patient support apparatus which overcomes one or more deficiencies in the prior art is desired.

DETAILED DESCRIPTION OF THE EMBODIMENTS

Figure 1:
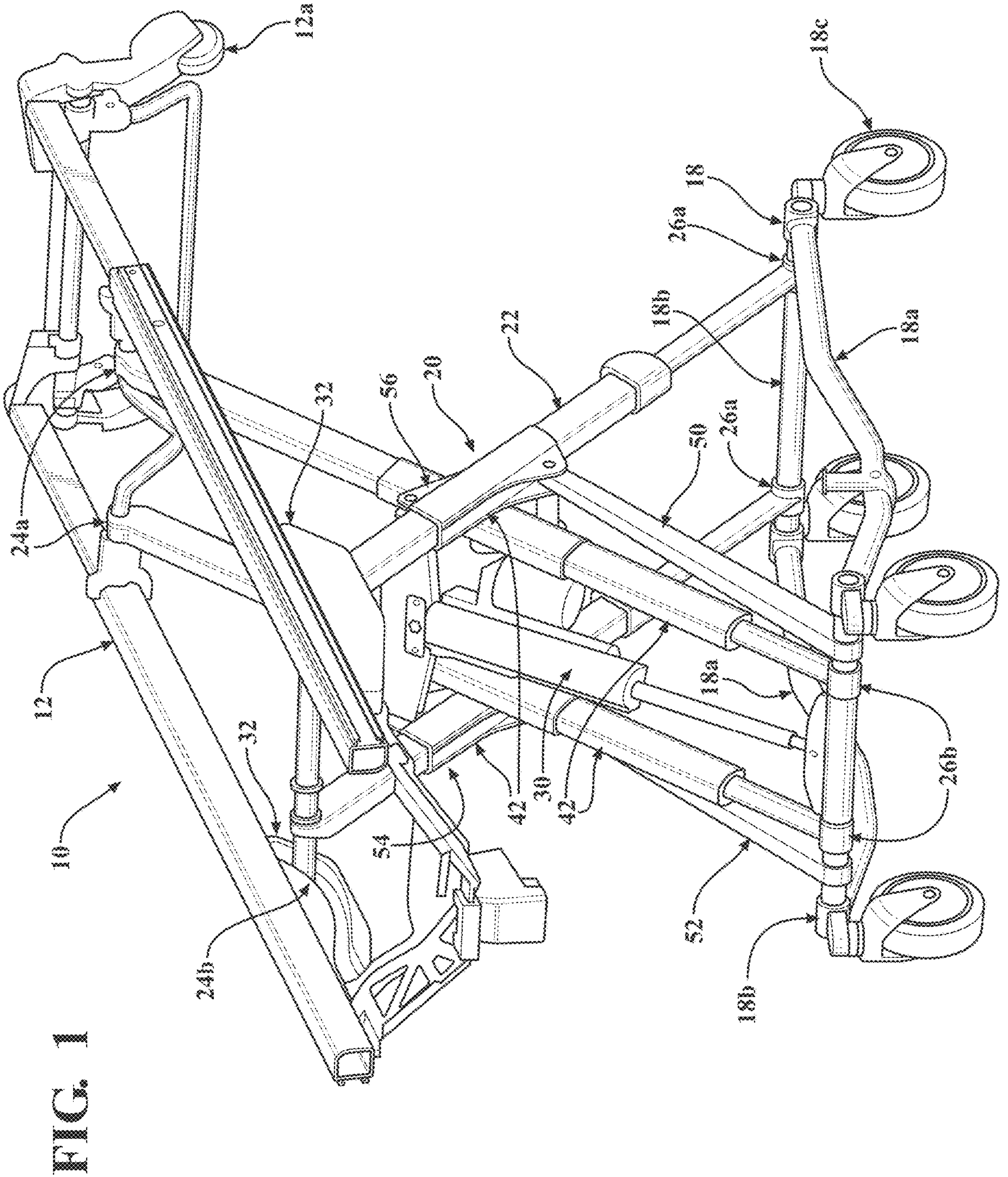
FIG. 1 is a perspective view of a patient support apparatus (with the patient support surface removed) with the lift assembly in its fully raised configuration.

Referring to FIG. 1, a perspective view of a patient support apparatus, such as a cot 10 is shown. Although the cot 10 is illustrated herein, the teachings of the present disclosure may be applied to any other patient support apparatus and are not limited to the cot 10. The term "patient support apparatus" is used broadly to mean an apparatus that can support a patient, such as a medical bed, including an apparatus that can transport a patient, such as an emergency cot, a stretcher, a stair chair, or other apparatuses that support and/or transport a patient. Further, the term "patient" is used broadly to include persons that are under medical treatment or an invalid, or persons who just need assistance.

Referring again to FIGS. 1-3, the cot 10 includes a frame 12, which in the illustrated embodiment comprises a litter frame that supports a litter deck (shown in phantom in FIG. 3), which provides a patient support surface, and a base 18. As will be more fully described below, cot 10 includes a lift assembly 20 that raises or lowers the base 18 or the frame 12 with respect to the other so that the cot 10 can be rearranged between a more compact configuration, for example, for loading into an emergency vehicle, such as an ambulance, and a configuration for use in transporting a patient across a ground surface.

Referring again to FIG. 1, the frame 12 is mounted to the base 18 by lift assembly 20, which includes load bearing members 22 pivotally coupled to the frame 12 and to the base 18. In the illustrated embodiment, load bearing members 22 are pivotally coupled to the frame 12 by head-end upper pivot connections 24*a* and foot-end upper pivot connections 24*b*.

Figure 2:
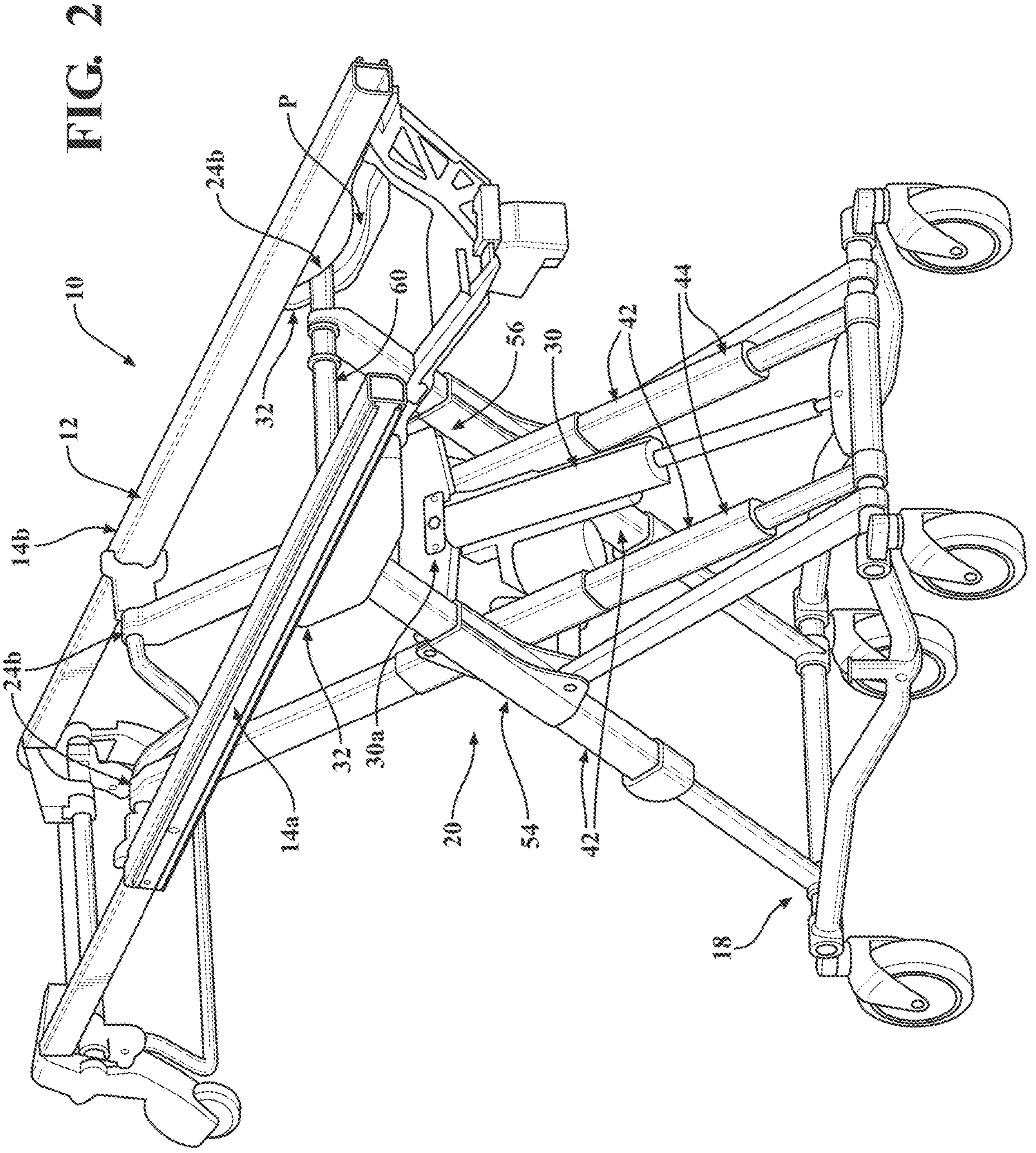
FIG. 2 is a second perspective view of the patient support apparatus of FIG. 1.
Figure 3:
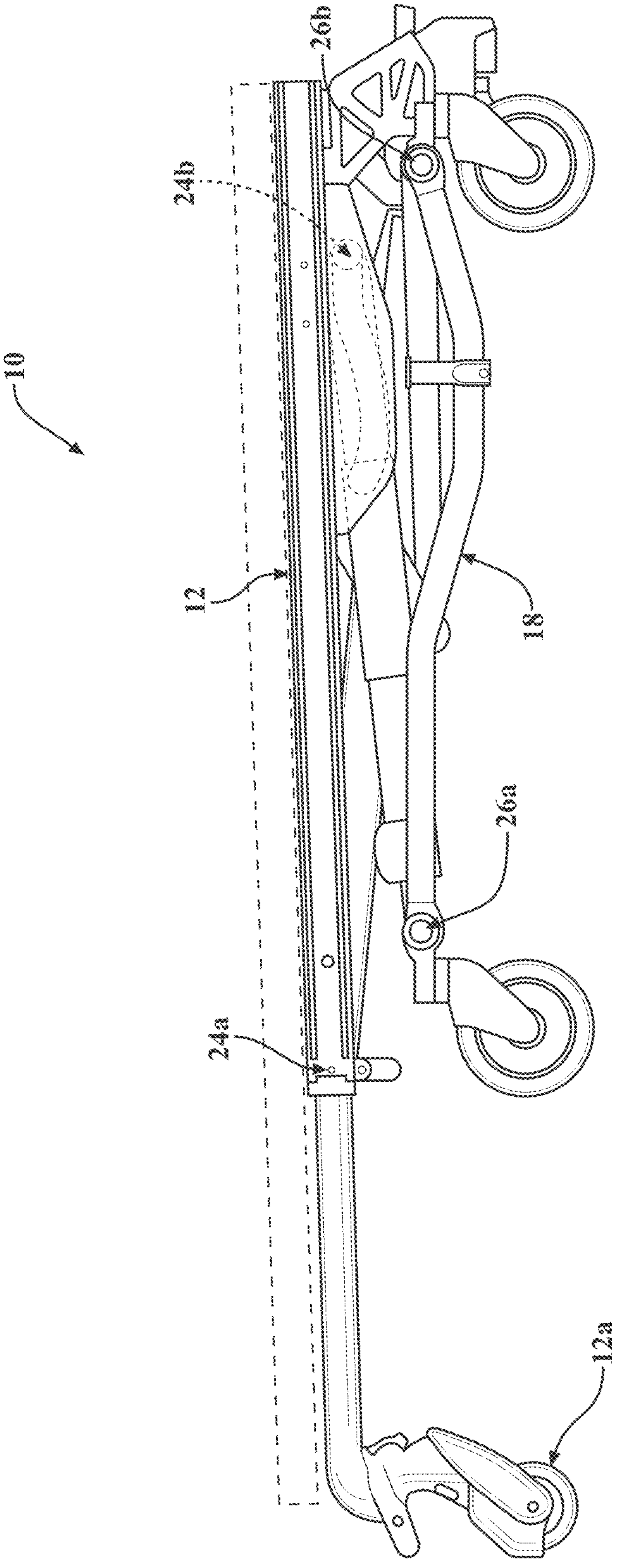
FIG. 3 is a side elevation view of the patient support apparatus in its fully lowered configuration.
Figure 4:
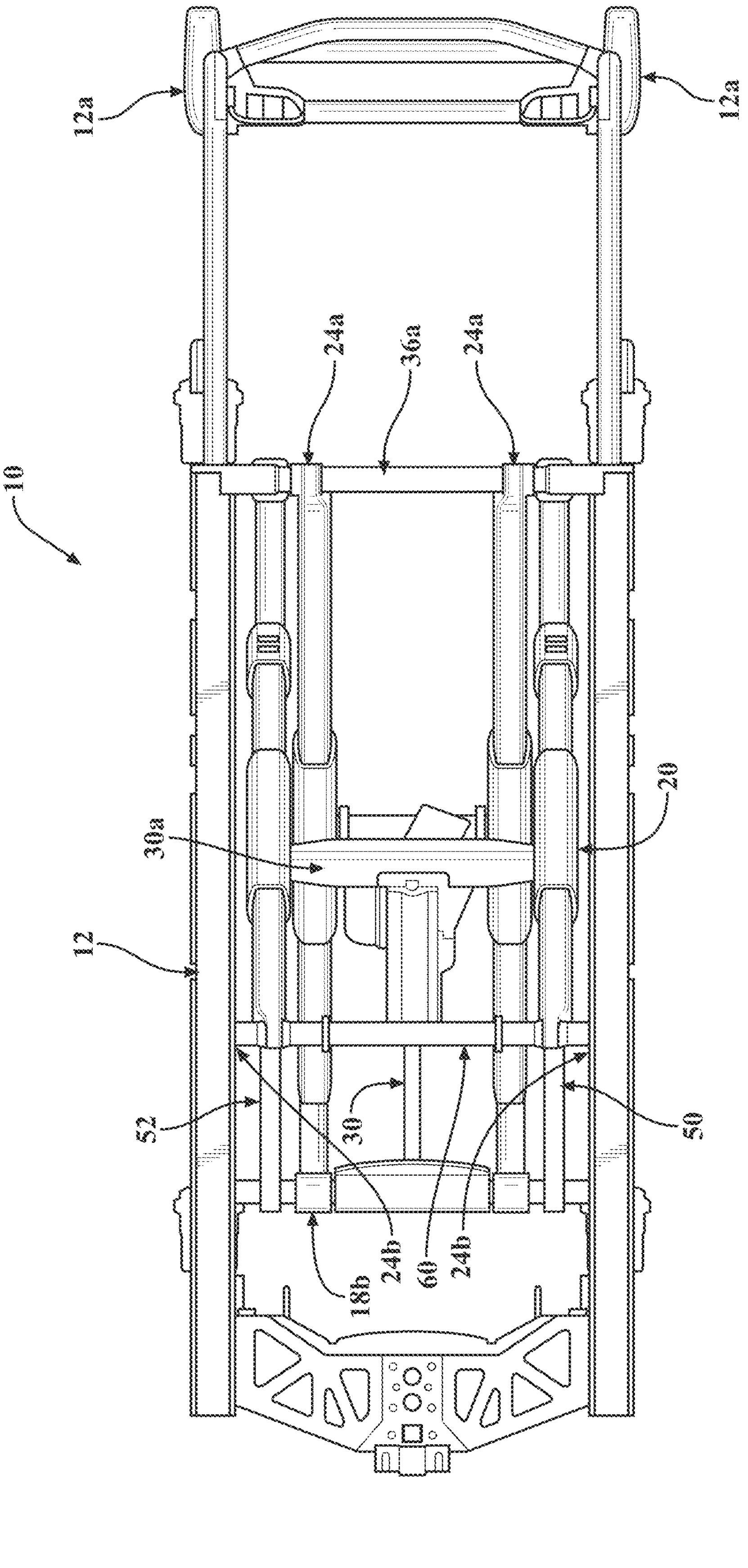
FIG. 4 is a top plan view of the patient support apparatus of FIG. 3.

In the illustrated embodiment, each load bearing member 22 comprises a telescoping compression/tension member 42. The telescoping compression/tension members 42 may be pivotally joined at their medial portions about a pivot axis to thereby form a pair of X-frames 44 (FIG. 2). The upper ends of each X-frame 44 are, therefore, pivotally mounted to the frame 12 by head-end upper pivot connections 24*a* and foot-end upper pivot connections 24*b*. The lower ends of each X-frame 44 are pivotally mounted to the base 18 by head-end lower pivot connections 26*a* and foot-end lower pivot connections 26*b*. However, it should be understood that other configurations are contemplated. In some embodiments, lift assemblies may be similar to as is disclosed in U.S. Pat. No. 7,398,571, entitled "Ambulance cot and hydraulic elevating mechanism therefor," and/or in U.S. Pat. No. 9,486,373, entitled "Reconfigurable patient support," the disclosures of each of which are hereby incorporated by reference in their entirety. Other configurations are contemplated.

In addition to load bearing members 22, the cot 10 includes a pair of linkage members 50 and 52 (FIG. 1), which are pivotally mounted on one end to transverse frame members 18*b* of base 18 and on their other ends to brackets 54, 56 (FIG. 1), which mount to the X-frames 44 and also provide a mount for an actuator 30 (FIG. 1), which extends or contracts the lift assembly 20 to raise or lower frame 12 relative to the base 18 (or raise or lower the base 18 relative to the frame 12) as described below. Brackets 54 and 56 therefore, pivotally mount the pair of linkage members 50 and 52, as well as actuator 30 (described below), to the X-frames 44 (FIG. 2) so that the pair of linkage members 50 and 52 provide a timing link function as well as a moment coupling function. It should be understood that multiple actuators may be used to raise or lower frame 12.

Figure 5:
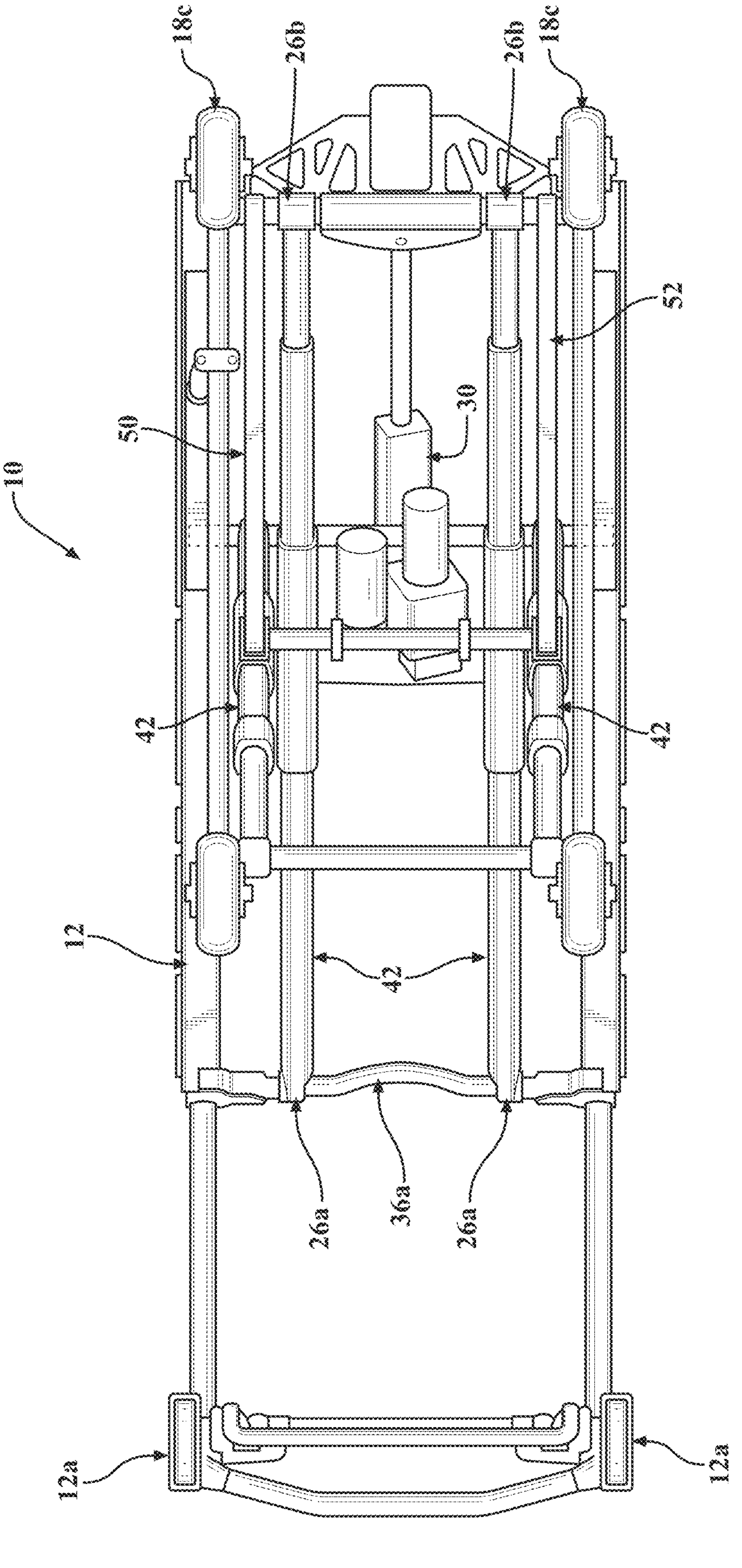
FIG. 5 is a bottom plan view of the patient support apparatus of FIG. 3.

As best seen in FIG. 1, the base 18 is formed by longitudinal frame members 18*a* and the transverse frame members 18*b*, which are joined together to form a frame for base 18. Mounted to the longitudinal frame members 18*a* are bearings 18*c*, such as wheels or castors. The transverse frame members 18*b* provide a mount for the lower pivot connections 26*a*, 26*b* (FIGS. 3 and 5) of load bearing members 22, and also for the rod end of the actuator 30. As described above, the upper end of actuator 30 is mounted between the X-frames 44 (formed by load bearing members 22) by a transverse member 30*a* that is mounted to brackets 54, 56.

As noted above, the lift assembly 20 is extended or contracted by actuator 30. In the illustrated embodiment, actuator 30 comprises a hydraulic system 60 including a hydraulic cylinder 80, which is controlled by a control system 82. Although one actuator 30 is illustrated, it should be understood that more than one actuator or cylinder may be used. As will be more fully described below, the control system 82 includes a hydraulic circuit 90 and a controller 120, which is in communication with hydraulic circuit 90 and user interface controls 120*a* that allows an operator to select between the lifting, lowering, and raising functions described herein. For example, the user interface controls 120*a* may have a touch screen with touch screen areas or may comprise a key pad with push buttons, such as directional buttons, or switches, such as key switches, that correspond to the lifting, lowering, raising, and retracting functions described herein to allow the user to select the mode of operation and generate input signals to controller 120. As will be more fully described below, the controller 120 may also automatically control the mode of operation.

Figure 6:
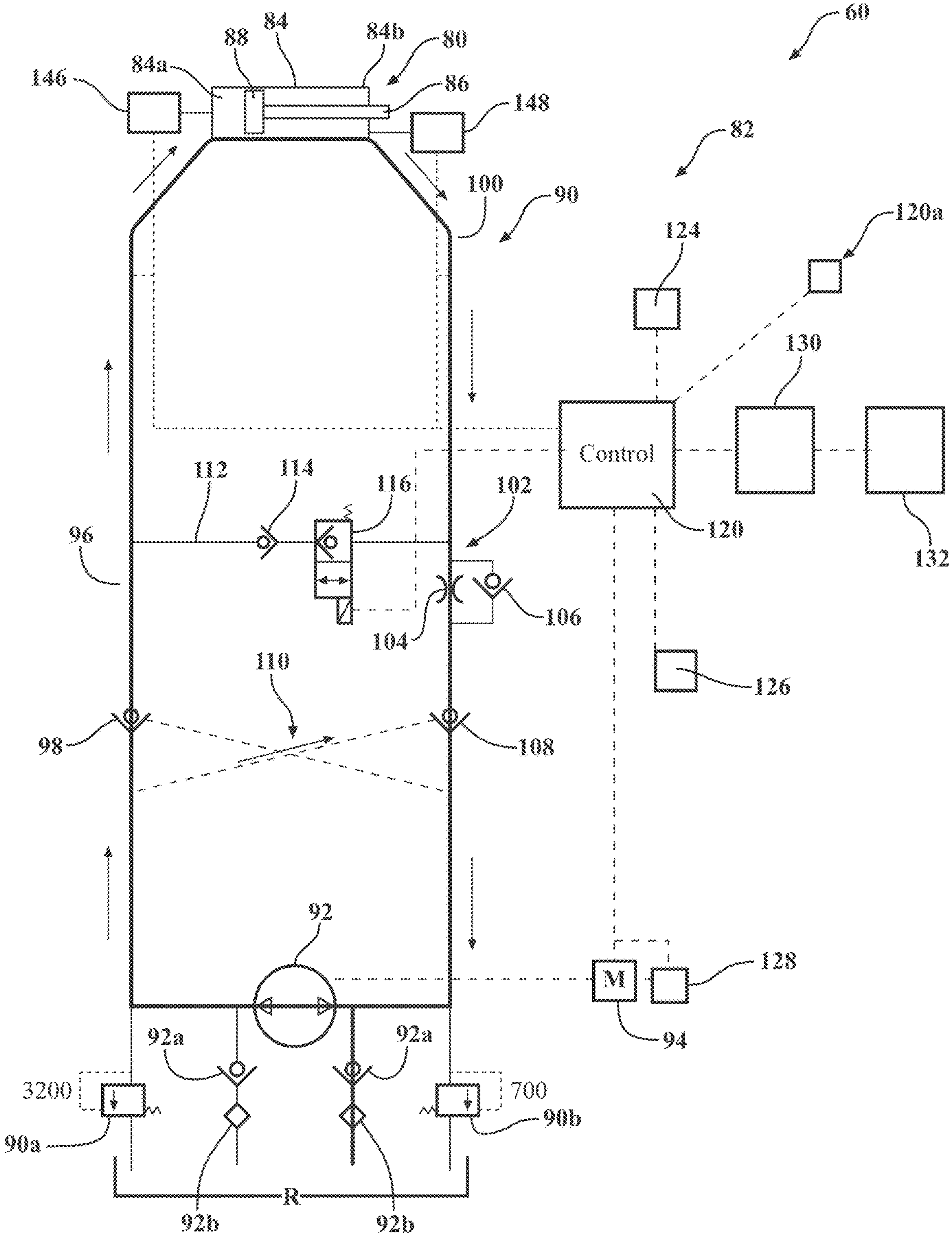
FIG. 6 is a hydraulic circuit diagram of the hydraulic system and control system in one embodiment of the patient support apparatus illustrating the flow of hydraulic fluid in the lifting or raising mode of the frame relative to the base of the patient support apparatus when the base is supported on a ground surface.
Figure 7:
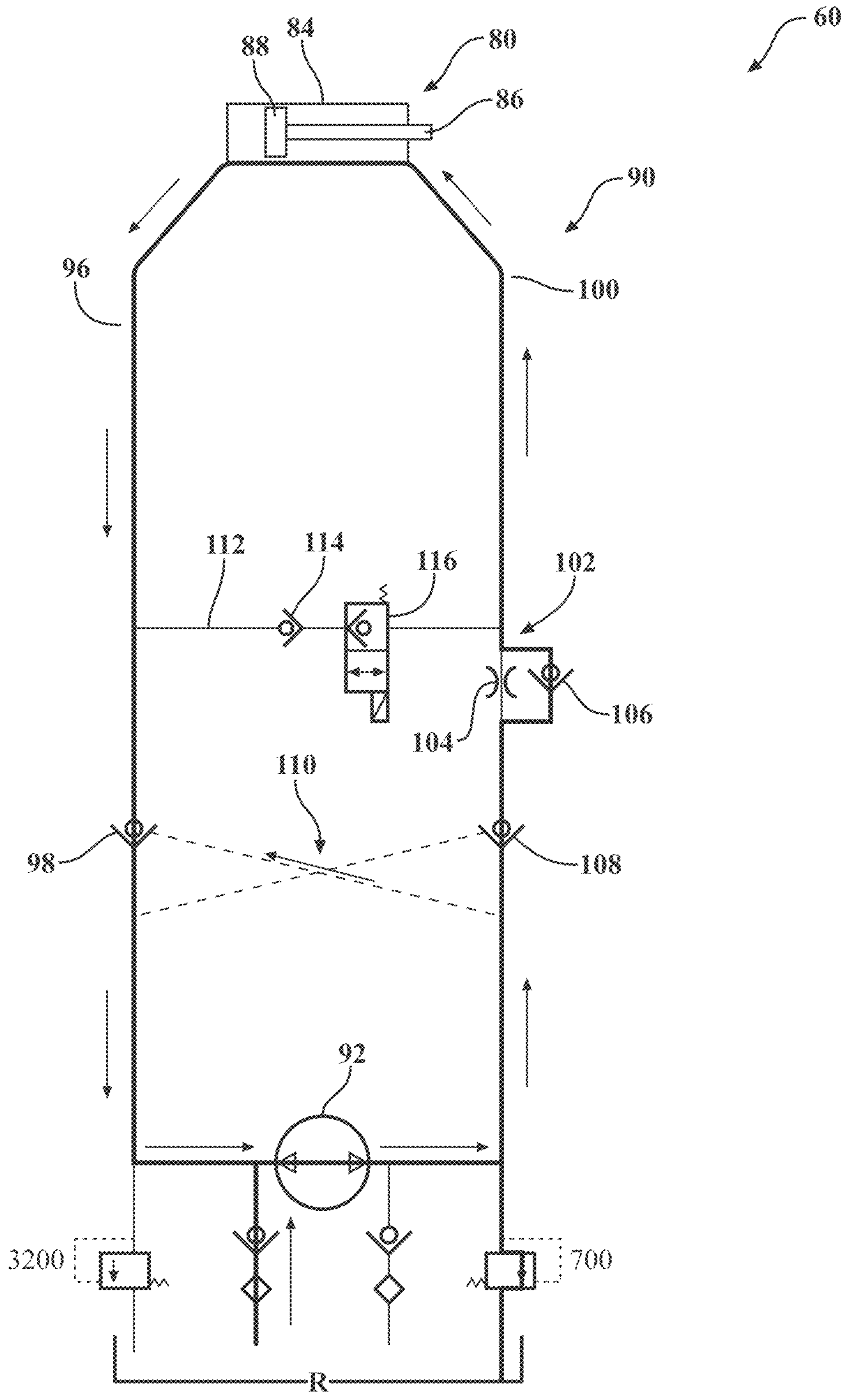
FIG. 7 is the hydraulic circuit diagram of FIG. 6 illustrating the flow of hydraulic fluid in the raising or retracting mode of the base of the patient support apparatus when the frame is raised and supported by an emergency vehicle.
Figure 8:
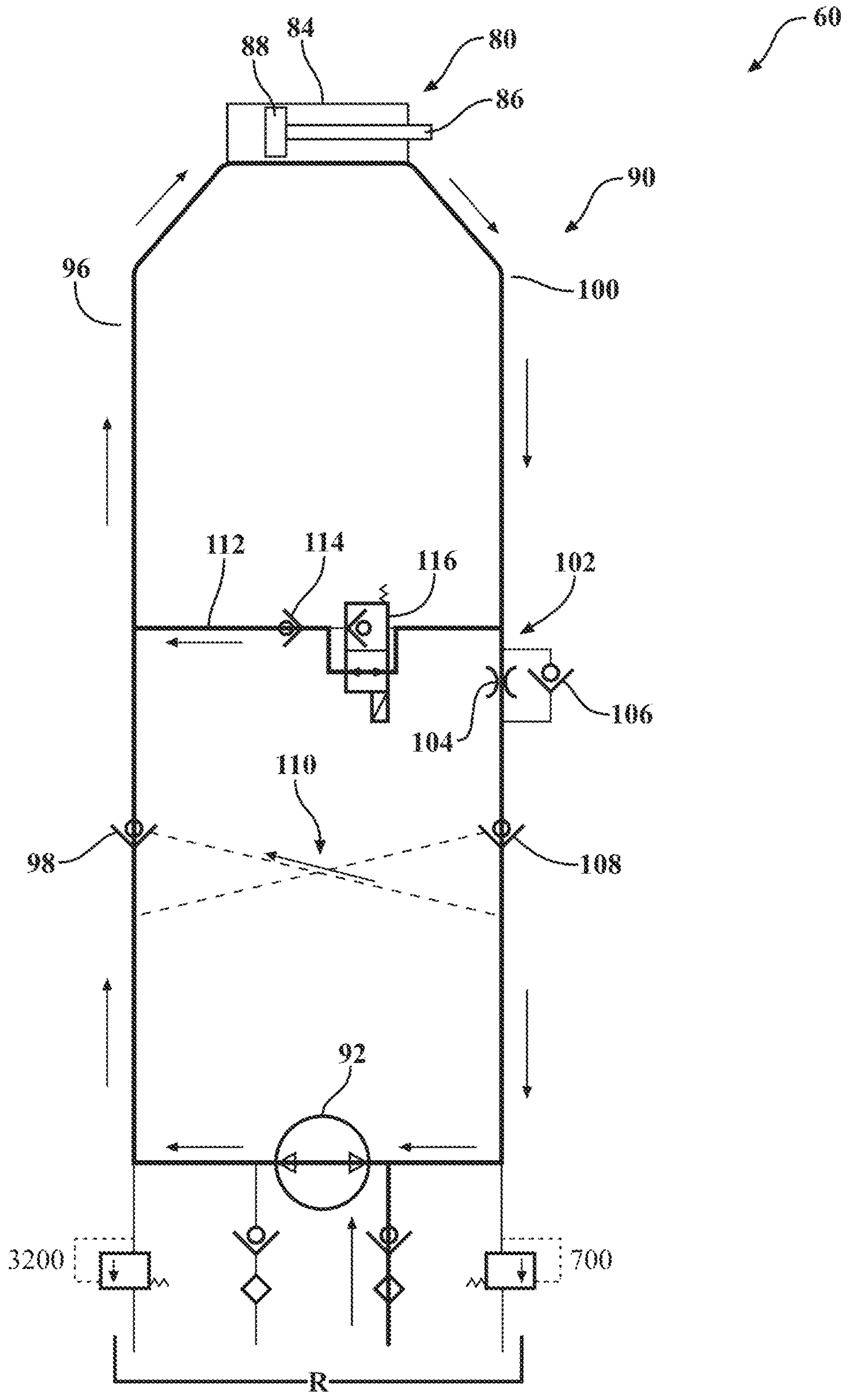
FIG. 8 is the hydraulic circuit diagram of FIG. 6 illustrating the flow of hydraulic fluid in the lowering mode of the base of the patient support apparatus when the patient support apparatus is in a compact configuration and the frame is supported by an emergency vehicle.

Referring to FIGS. 6-8, the hydraulic cylinder 80 includes a cylinder housing 84 with a reciprocal rod 86. Mounted at one end of rod 86 is a piston 88, which is located within the cylinder housing 84. The distal end of the reciprocal rod 86 is extended from the cylinder housing 84 and connected in a conventional manner to transverse frame member 18*b* of base 18. And as described above, the other end or fixed end (or cap end) of the hydraulic cylinder 80 is mounted between the brackets 54, 56.

The hydraulic cylinder 80 is extended or retracted by control system 82 to extend or contract lift assembly 20 and generally operates in four modes, namely (first mode) to raise the frame 12 when base 18 is supported on, for example, a ground surface (FIG. 6), (second mode) to lower the frame 12 when base 18 is supported on, for example, a ground surface (FIG. 7), (third mode) to lower or extend base 18 when the cot 10 is in its loading (compact) configuration and when the frame 12 is supported, for example, by an attendant or a loading and unloading apparatus (FIG. 8), or (fourth mode) to raise base 18 when the frame 12 is supported, for example, by an attendant or a loading and unloading apparatus (FIG. 7) and when the cot 10 is in its transport (raised) configuration to reconfigure the apparatus into its loading (compact) configuration. As will be more fully described below, when lowering base 18 relative to frame 12 (when frame 12 is supported) control system 82 is configured to automatically lower or extend base 18 at a faster speed unless certain conditions exist.

Referring to FIGS. 6-8, the hydraulic circuit 90 includes a pump 92, which is in fluid communication with a fluid reservoir or reservoir R, to pump fluid from the reservoir R to the hydraulic cylinder 80. As best seen in FIG. 6, when a user selects the first mode of operation (e.g. via the user interface) to raise or lift the frame 12, the controller 120 powers the motor 94, which operates pump 92 to pump fluid from the reservoir R, through filters 92*b* and check valves 92*a*, into the hydraulic circuit 90 to direct the flow of fluid to the hydraulic cylinder 80. To avoid over pressurization, for example, when a heavy patient is supported on frame 12, fluid may be discharged from the hydraulic circuit 90, for example, when the pressure in the hydraulic circuit 90 exceeds a designated pressure (e.g. 3200 psi on the cap side of the hydraulic circuit 90, and 700 psi on the rod side of the hydraulic circuit 90), through pressure relief valves 90*a* and 90*b*. It is to be understood that the pump 92, the hydraulic cylinder 80, and the various conduits carrying hydraulic fluid to the cylinder are typically always filled with hydraulic fluid. The pump 92 is driven by the motor 94 (both of which are optionally reversible) which may be electric. The motor 94 is operated by controller 120 to thereby control the pump 92.

With continued reference to FIG. 6, when an operator wishes to raise the frame 12 relative to the base 18 (first mode), and the base 18 is supported on a support surface, the operator, using user interface controls 120*a* (FIG. 6), generates input signals that are communicated to the controller 120. When operating in the first mode, the output of the pump 92 (in the direction indicated by the arrows in FIG. 6) will supply hydraulic fluid through a hydraulic conduit 96 to the cap end chamber 84*a* of the cylinder housing 84, which is on the piston side of rod 86. The hydraulic circuit 90 includes a pilot operated check valve 98 that is opened when fluid flows to the cap end chamber 84*a* and closed when fluid to the cap end chamber 84*a* stops to retain the pressure in the cap end chamber 84*a* until it is opened by the pilot signal received from the other side of the hydraulic circuit 90 (a pilot operated check valve 108 described below) to allow the flow fluid from the cap end chamber 84*a* of the hydraulic cylinder 80 in the reverse direction when the rod 86 is being retracted.

When fluid is directed to cap end chamber 84*a*, the rod 86 will extend to raise the frame 12 relative to base 18 at a first speed. This mode of operation is used when base 18 is supported on a support surface, such as the ground, which can be detected by the controller 120 in various ways described below. It should be understood, that the first mode may also be used to lower or extend the base 18 when the faster speed of the third mode described below is not appropriate or desired.

Referring to FIG. 7, when an operator wishes to select the second mode or the fourth mode, that is to lower the frame 12 relative to the base 18 (when the base 18 is supported on a support surface) or raise the base 18 relative to the frame 12 (when the frame 12 is supported), using the user interface controls 120*a*, the operator will generate an input signal to the controller 120 that will cause the controller 120 to operate in the second mode or the fourth mode. In the second mode or the fourth mode, the direction of the pump 92 is reversed, so that fluid will flow in an opposite direction (see arrows in FIG. 7) to the hydraulic cylinder 80 through a second hydraulic conduit 100, which is in fluid communication and connected to the rod end chamber 84*b* of the cylinder housing 84. The second hydraulic conduit 100 includes a check valve assembly 102, with an orifice or fluid throttle 104 and a poppet or check valve 106 in parallel, to control the flow of fluid through the second hydraulic conduit 100. Fluid flow in this direction will cause the rod 86 to retract and raise the base 18 when the frame 12 is supported or lower the frame 12 relative to the base 18 when the base 18 is supported.

A second pilot operated check valve 108 is also provided that is connected between the check valve assembly 102 and the pump 92. Optionally, valves 98 and 108 are provided as a dual pilot operated check valve assembly 110, which includes both of the pilot operated check valves (98 and 108) and allows fluid flow through each respect conduit in either direction. The pilot operated check valves 98, 108 of the dual pilot operated check valve assembly 110 are operated by the fluid pressure of the respective branch of hydraulic conduit (96 or 100) as well as the fluid pressure of the opposing branch of hydraulic conduit (96 or 100), as schematically shown by the dotted lines in FIGS. 6-8.

Referring to FIG. 8, when an operator selects the base 18 lowering function and the litter is supported (and the base 18 is unsupported), the controller 120 will automatically increase the speed of the hydraulic cylinder 80 over the first speed (the third mode). As would be understood by those skilled in the art, the speed of the hydraulic cylinder 80 or cylinders may be increased by increasing the flow of hydraulic fluid and/or pressure of the hydraulic fluid flowing to the hydraulic cylinder 80 unless certain conditions exist. Optionally, the user interface controls 120*a* may allow an operator to generate an input signal to select the third mode and/or to disable the third mode.

In order to speed up the extension of the rod 86 when operating in the third mode, the hydraulic circuit 90 includes a third hydraulic conduit 112, which is in fluid communication with the hydraulic conduits 96 and 100 via a check valve 114, to thereby allow fluid communication between the cap end chamber 84*a* and the rod end chamber 84*b* and to allow at least a portion of the fluid output from the rod end chamber 84*b* to be redirected to the cap end chamber 84*a*, which increases the speed of the rod 86 (i.e. by increasing the pressure and/or fluid flow of the fluid delivered to the cap end chamber 84*a*).

To control (e.g. open and close) fluid communication between the cap end chamber 84*a* and the rod end chamber 84*b* via the third hydraulic conduit 112, the third hydraulic conduit 112 includes a valve 116, such as a solenoid valve or a proportional control valve, which is normally closed but selectively controlled (e.g. opened) to open fluid communication between the rod end chamber 84*b* and the cap end chamber 84*a* as described below. As noted, this will allow at least a portion of the fluid output from the rod end chamber 84*b* to be redirected to the cap end chamber 84*a* to thereby increase the speed of rod 86. Optionally, an additional valve, (not shown) such as a solenoid valve, may be included in the second hydraulic conduit 100, for example, between the third hydraulic conduit 112 and the pump 92, which is normally open but can be selectively controlled (e.g. closed), so that the amount of fluid (and hence fluid pressure and/or fluid flow) that is redirected from the rod end chamber 84*b* may be varied. For example, all the fluid output from the rod end chamber 84*b* may be redirected to the cap end chamber 84*a*. In another embodiment, an additional electrically operated proportional control valve may be used in any of the branches of the hydraulic conduits (e.g. 96, 100, or 112) to control the rate of fluid flow through the respective conduits and thereby control and vary the speed of the extension of rod 86.

Referring again to FIG. 6, the controller 120 may be in communication with one or more sensors, which generate input signals to the controller 120 (or the controller 120 may detect the state of the sensor) to allow the controller 120 to adjust the hydraulic circuit 90 based on an input signal or signals from or the status of the sensors, described more fully below. Suitable sensors may include Hall Effect sensors, proximity sensors, reed switches, optical sensors, ultrasonic sensors, liquid level sensors (such as available from MTS under the brand name TEMPOSONIC), linear variable displacement transformer (LVDT) sensors, or other transducers or the like.

For example, the controller 120 may control (e.g. open or close) the valve 116 to increase or stop the increased speed of the hydraulic cylinder 80 and/or slow or stop the pump 92 to slow or stop the hydraulic cylinder 80, or any combination thereof based on an input signal or signals from or the status of the sensor(s). Further, the controller 120 may control (e.g. close) the valve 116 before, after, or at the same time as slowing or stopping the pump 92 based on an input signal or signals from or the status of the sensor(s). Alternately, the controller 120 may slow, increase the speed of, or stop the pump 92 in lieu of controlling (e.g., opening or dosing) the valve 116 based on an input signal or signals from or the status of the sensor(s). For example, when there is no weight sensed on the base 18, the motor 94 may be configured to drive the pump 92 at a higher speed (e.g. by increasing the motor pulse width modulation (PWM)) to generate higher fluid flow and pressure. Operation of the pump 92, controller 120, as well as other systems and/or components may be similar to as is disclosed in U.S. patent application Ser. No. 17/081,593 which is based on and claims priority to U.S. Provisional Patent Application No. 62/926,711, titled "Hydraulic Valve and System" and filed on Oct. 28, 2019, and/or similar to as is disclosed in U.S. patent application Ser. No. 17/081,608 which is based on and claims priority to U.S. Provisional Patent Application No. 62/926,712, titled "Hydraulic Circuit for a Patient Support Apparatus," the disclosures of each of which are hereby incorporated by reference in their entirety. Other configurations are contemplated.

In some embodiments, the control system 82 may include one or more sensors to detect when the base 18 of the cot 10 is contacting the ground or other surface, such as a bumper or another obstruction, which, as noted, may be used as an input signal or signals to the controller 120 to control the hydraulic circuit 90. Here, similar control systems 82 and/or sensors are disclosed in U.S. patent application Ser. No. 17/081,608, previously referenced. Suitable sensors may include Hall Effect sensors, proximity sensors, reed switches, optical sensors, ultrasonic sensors, liquid level sensors (such as available from MTS under the brand name TEMPOSONIC), linear variable displacement transformer (LVDT) sensors, or other transducers or the like. Other configurations are contemplated.

Further, in addition, or alternately, the control system 82 may include one or more sensors 124 (FIG. 6) that detect the height of the cot 10. Similarly, suitable sensors may include Hall Effect sensors, proximity sensors, reed switches, optical sensors, ultrasonic sensors, liquid level sensors (such as available from MTS under the brand name TEMPOSONIC), linear variable displacement transformer (LVDT) sensors, or the like. Here, aspects of the sensors, control system 82, and/or other components of the cot 10 may be similar to as is described in U.S. patent application Ser. No. 15/949,648, entitled "Patient Handling Apparatus with Hydraulic Control System," and/or as is described in U.S. patent application Ser. No. 16/271,117, entitled "Techniques for Determining a Pose of a Patient Transport Apparatus," the disclosures of each of which are hereby incorporated by reference in their entirety. Other configurations are contemplated.

In yet another embodiment, the control system 82 may include one or more sensors 126 (FIG. 6) that detect the configuration of the cot 10. For example, similar to sensor 124 noted above, transducers (see above for list of suitable transducers or sensors) may be placed at different locations about the cot 10 that detect magnets also placed at different locations about the cot 10. In this manner, when a magnet is aligned with the transducer (or one of the transducers), the magnetic field will be detected by that transducer, which transducer then generates a signal or signals that indicate that the cot 10 is in a defined configuration or height (associated with the location of that transducer) of the cot 10. The number of configurations may be varied—for example, a single sensor may be provided to detect a single configuration (e.g. fully raised configuration or a fully lowered configuration) or multiple sensors may be used to detect multiple configurations, with each transducer detecting a specific configuration. Again, the sensors can create an appropriate input signal to the controller 120 that is indicative of the configuration of the cot 10. Control systems 82 that are similarly configured to employ, define, or otherwise utilize safe transport height features are described in U.S. patent application Ser. No. 16/271,114, entitled "Patient Transport Apparatus with Defined Transport Height," the disclosure of which is hereby incorporated by reference in its entirety.

Further, when multiple configurations are detected, the controller 120 may compare the detected configuration of cot 10 to a prescribed configuration and, in response, control the hydraulic circuit 90 based on whether the cot 10 is in or near a prescribed configuration or not. Or when only a single configuration is detected, the controller 120 may simple use the signal from the sensor as an input signal and control the hydraulic circuit 90 based on the input signal.

When the cot 10 is no longer in the prescribed configuration (e.g. by comparing the detected configuration to a prescribed configuration stored in memory or detecting that it is not in a prescribed configuration), the controller 120 may be configured to open or reopen the valve 116 to allow the hydraulic cylinder 80 to operate at its increased speed but then close the valve 116 when the controller 120 detects that cot 10 is in a prescribed configuration and/or, further, may slow or stop the motor 94 to stop the pump 92 or reverse the motor 94.

For example, one of the prescribed configurations may be when the lift assembly 20 is in its transport or fully raised configuration. In this manner, similar to the previous embodiment, when the controller 120 detects that cot 10 is near or in its fully raised configuration, the controller 120 may be configured to close the valve 116 so that the hydraulic cylinder 80 can no longer be driven at the increased speed, and further may also stop motor 94 to stop the pump 92. As noted above, the controller 120 may open or close the valve 116 before, after, or at the same time as stopping the pump 92 (or reversing the motor 94) based on the input signal or signals from or the status of the sensor(s) 124. Alternately, the controller 120 may stop the pump 92 in lieu of closing the valve 116 based on an input signal or signals from or the status of the sensor(s) 124.

In yet another embodiment, the control system 82 may include a sensor 128 (FIG. 6), which is in communication with controller 120, to detect when a load on the motor 94 (or on the pump 92) occurs. For example, sensor 128 may detect current drawn by the motor 94. In this manner, using sensor 128, the controller 120 can detect when the base 18 is supported on a surface, such as the ground or the deck of the emergency vehicle, by detecting when the motor 94 or the pump 92 encounter increased resistance, for example, by detecting the current in the motor 94. As would be understood, this increased resistance would occur when the base 18 is either supported or encounters an obstruction. Further, the controller 120 may be configured to detect when the load has exceeded a prescribed value (e.g. by comparing the detected load to a store load value in memory), and optionally close the valve 116 to no longer allow fluid communication between the rod end chamber 84*b* and the cap end chamber 84*a* via the third hydraulic conduit 112 when the load has exceeded the prescribed value. As noted above, the controller 120 may open or close the valve 116 before the load reaches the prescribed value and further before, after, or at the same time as slowing or stopping the pump 92 based on an input signal or signals from or the status of the sensor(s) 128. As noted above, the controller 120 may also reverse the motor 94 before, after, or at the same time it closes valve 116. Alternately, controller 120 may slow or stop the pump 92 in lieu of closing the valve 116 based on an input signal or signals from or the status of the sensor(s) 128.

So, for example, if an attendant is removing a patient support apparatus from an emergency vehicle and has selected the base lowering function, and while the base 18 is being lowered at the increased speed, the controller 120 detects that the motor 94 or pump 92 is under an increase in load (e.g., detects an increase in current) (which, as noted, would occur when the base 18 is supported, either by a support surface or an obstruction) the controller 120 may close the valve 116 so that the hydraulic cylinder 80 will no longer be driven at the increased speed. Optionally, the controller 120 may also or instead slow or stop the pump 92 and/or stop the pump 92 before closing the valve 116. Alternately, the controller 120 may simultaneously close the valve 116 and slow or stop the pump 92. As described above, in yet another embodiment, controller 120 may close the valve 116 prior to base 18 being supported (for example, when the frame 12 or base 18 reaches a prescribed height or when the cot 10 has a prescribed configuration) and only after the controller 120 detects that base 18 has contacted the ground surface and/or the base 18 is fully lowered, the controller 120 will stop the pump 92 so that the hydraulic cylinder 80 will no longer extend. Or the controller 120 may be configured to stop the pump 92 before the base 18 reaches the ground to avoid overshoot.

The controller 120 may also receive signals indicative of the presence of the cot 10 near an emergency vehicle. For example, a transducer may be mounted to the cot 10 and a magnet may be mounted to the emergency vehicle and located so that when cot 10 is near the emergency vehicle, the transducer will detect the magnet and generate a signal based on its detection. In this manner, when an operator has selected the base 18 extending (e.g. lowering) function and the controller 120 detects that cot 10 is near an emergency vehicle and, further, detects one or more of the other conditions above (e.g., that the base 18 is not contacting a support surface or there is no load on the motor 94 or the pump 92 or the cot 10 is not in a prescribed configuration), the controller 120 may open the valve 116 to allow the hydraulic cylinder 80 to be driven at the increased speed. In this manner, these additional input signals may confirm that the situation is consistent with a third mode of operation.

Alternately, the controller 120 may also receive signals indicative of the presence of the cot 10 in an emergency vehicle. For example, a transducer may be mounted to the cot 10 and a magnet may be mounted to the emergency vehicle and located so that when the cot 10 is in the emergency vehicle, the transducer will detect the magnet and generate a signal based on its detection. In this manner, when an operator has selected the base lowering function and the controller 120 detects that cot 10 is in the emergency vehicle and detects one or more of the other conditions above (e.g., that the base 18 is not contacting a support surface or there is no load on the motor 94 or pump 92 or the cot 10 is not in a prescribed configuration), the signal indicating that cot 10 is in the emergency vehicle will override the detection of the other conditions and the controller 120 may maintain valve 116 closed to prevent the hydraulic cylinder 80 from being driven at the increased speed and, further, override the input signal generated by the operator. Details regarding sensing the proximity to or location in an emergency vehicle are described in U.S. patent application Ser. No. 14/998,028, entitled "Patient Support," the disclosure of which is hereby incorporated by reference in its entirety. Other configurations are contemplated.

In yet another embodiment, the cot 10 may include a cot-based communication system 130 (FIG. 6) for communicating with a loading and unloading based communication system 132 on a loading and unloading apparatus. For example, the cot-based communication system 130 may be wireless, such as RF communication systems (including near-field communication systems). For example, the control system 82 may be operable to open or close the valve 116 based on a signal received from the loading and unloading based communication system 132. In this manner, the deployment of the base 18 of the cot 10 may be controlled by someone at the loading and unloading apparatus or someone controlling the loading and unloading apparatus.

In one embodiment, rather than allowing the controller 120 to start in the third mode (when all the conditions are satisfied), the controller 120 may be configured initially to start the base lowering function in the first mode, where the base 18 is lowered at the slower, first speed. Only after the controller 120 has checked that there is a change in the load (e.g. by checking a sensor, for example a load cell or current sensing sensor) on the motor 94 to confirm that the motor 94 or the pump 92 are now under a load (which would occur once the apparatus is pulled from the emergency vehicle and the base 18 is being lowered), does the controller 120 then switch to the third mode to operate the hydraulic cylinder 80 at the faster, second speed. Again, once operating in the third mode, should the controller 120 detect one or more of the conditions noted above (e.g., the base 18 is supported or encounters an obstruction, the height exceeds a prescribed height, the configuration is in a prescribed configuration, the load on the motor 94 or the pump 92 exceeds a prescribed value) the controller 120 will close the valve 116 and optionally further slow or stop the pump 92. As noted above, the valve 116 may be closed by the controller 120 after the pump 92 is slowed or stopped or simultaneously.

In any of the above embodiments, it should be understood that control system 82 can control the hydraulic circuit 90 to slow or stop the extension of rod 86 of the hydraulic cylinder 80, using any of the methods described above, before the conditions noted above, such as before reaching a predetermined height, before reaching a predetermined configuration, before making contact with the ground or an obstruction, or before reaching a prescribed load on the motor 94 etc. Further, control of the fluid through the hydraulic circuit 90 may be achieved by controlling the flow rate or opening or closing the flow using the various valves noted above that are shown and/or described. Further, as noted to avoid excess pressure in the hydraulic circuit 90, the controller 120 may reverse the motor 94 when controlling the valves described herein or may slow or stop the motor 94 and the pump 92 before reaching the target (e.g. maximum height). Additionally, also as noted, the controller 120 may control the hydraulic circuit 90 by (1) adjusting the flow control valves or valves (e.g. valve 116), (2) adjusting the pump 92 (slow down or stop) or (3) adjusting both the flow control valves or valves (e.g. valve 116) and the pump 92, in any sequence.

Figure 10:
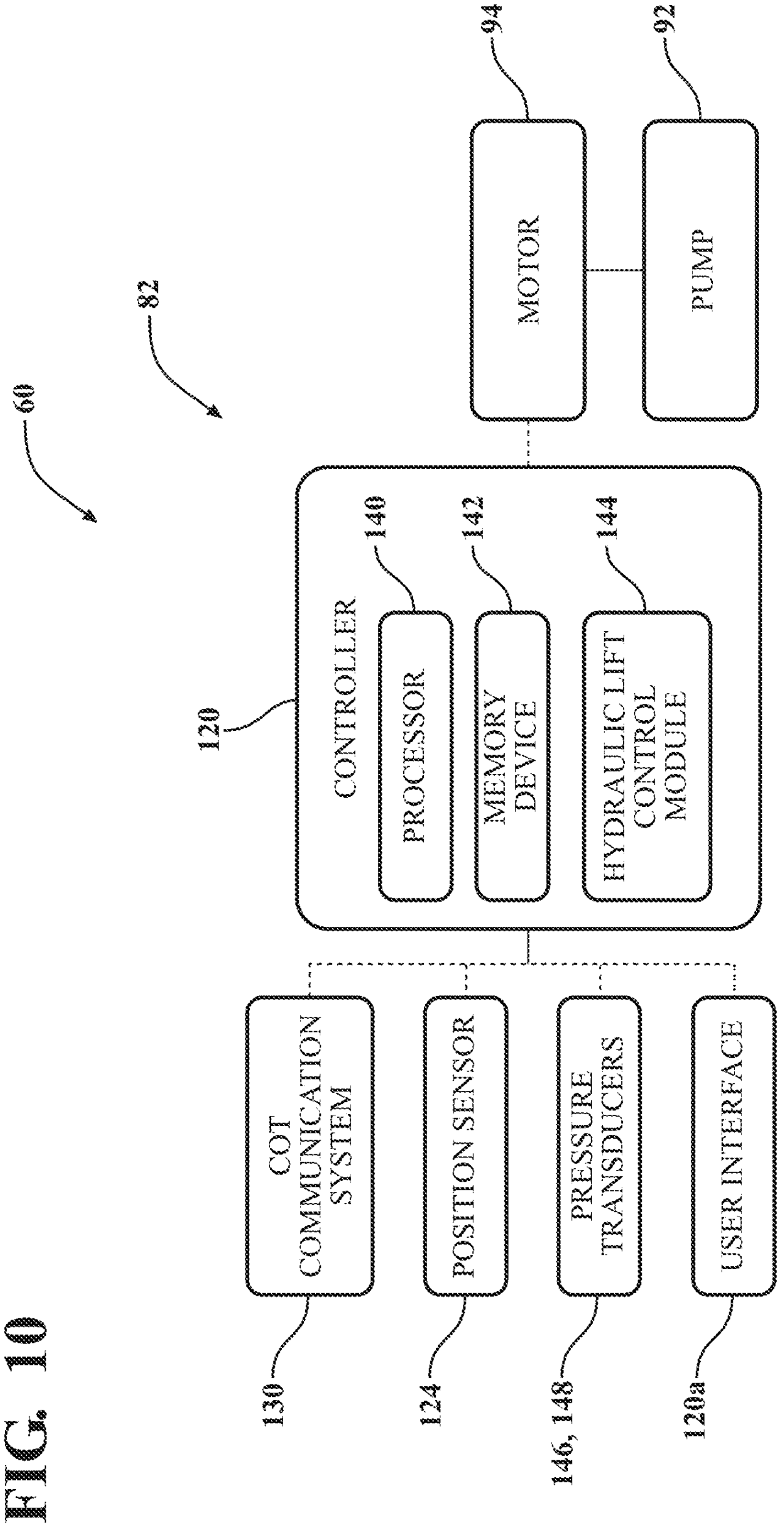
FIG. 10 is a schematic block diagram of the control system used with the hydraulic system.

Referring to FIG. 10, the controller 120 includes a processor 140 coupled to a memory device 142. The memory device 142 stores various programs and data that are executed by the processor for operating the control system 82. For example, the memory device 142 stores a hydraulic control lift software module 144 that includes computer executable instructions that, when executed by the processor 140, cause the processor 140 to operate the control system 82 to extend or retract the hydraulic cylinder 80 as described above, and to operate hydraulic oscillation dampening via control with pressure feedback.

Figure 9:
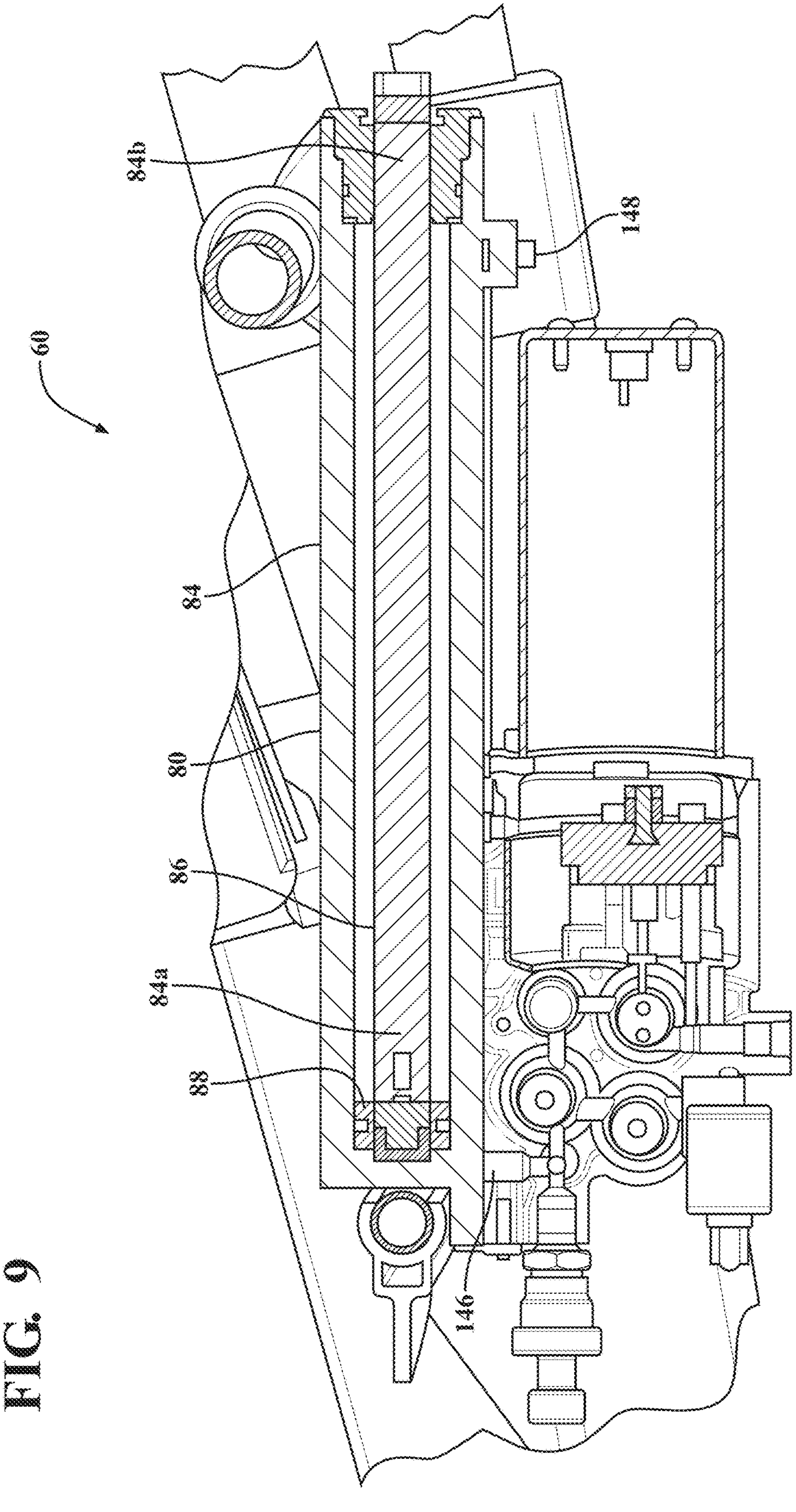
FIG. 9 is a schematic diagram of the hydraulic system.

In certain more conventional designs of cots 10, load height can change based on the weight of the patient, and the lift and lower motions may occur at different speeds depending on patient weight. Here, the control system 82 of the present disclosure also includes one or more hydraulic pressure transducers 146, 148 (shown in FIGS. 6 and 9) that are connected to the hydraulic circuit 90 to provide signals to the controller 120 that are indicative of the magnitude of the fluid pressure, which may be used as input when controlling the hydraulic cylinder 80. For example, the control system 82 may include a first hydraulic pressure transducer 146 that is connected to the cap side (e.g., the cap end chamber 84*a*) of the actuator 30 above the pilot operated check valve 98. In addition, the control system 82 may include a second hydraulic pressure transducer 148 that is connected to the rod side (e.g., the rod end chamber 84*b*) of the actuator 30 above the pilot operated check valve 108.

Figure 11:
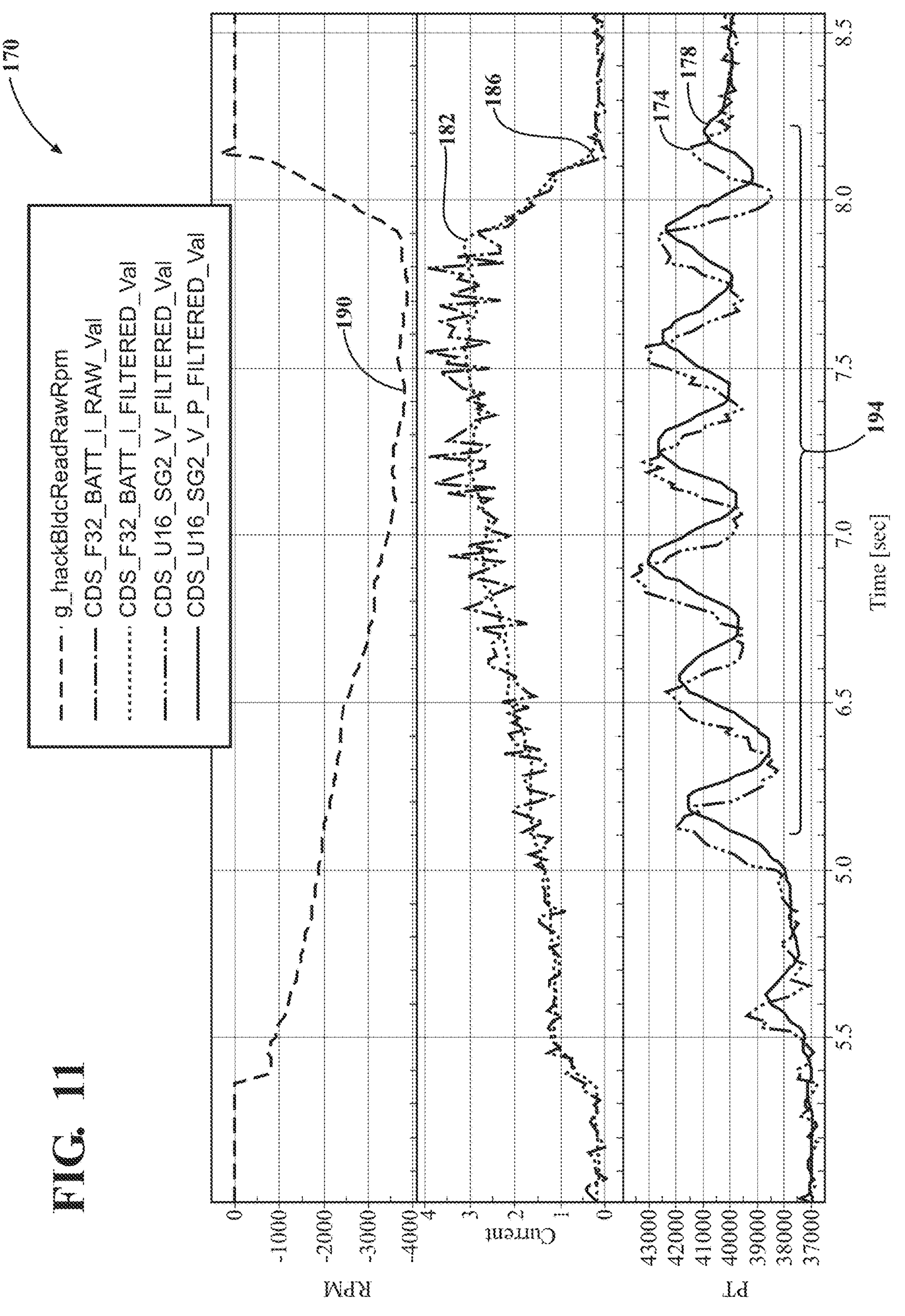
FIG. 11 is a graph illustrating various sensed operational parameters during an operation of the hydraulic system in the lowering mode.

With reference to FIG. 11, a graph 170 illustrating various sensed operational parameters during an operation of the hydraulic system in the lowering mode is shown. When operating at a max safe working load of the cot 10, an oscillation may be induced at the start of a lower operation under general operating conditions as evidenced from the signals 174 and 178. Here, when one of the pilot operated check valves 98, 108 holding high pressure is released by a pilot signal, the released pressure feeds into the pump 92, which causes the lower operation to slow down. Under general operating conditions, the controller 120 counteracts this by increasing power to the motor 94 of the pump 92 to speed up the lower operation, as evidenced by signals 182, 186 and/or 190. However, increasing power to the motor 94 causes the built-up pressure to act like a spring, resulting in a drop in pressure. However, when the pressure drops, the pump 92 speeds up due to the change in pressure and, as the pump 92 speeds up, the controller 120 decreases power to the motor 94 of the pump 92. Thus, under general operating conditions at the max safe working load of the cot 10, this high pressure/increased power and low pressure/decreased power "cycle" can result in an induced sustained oscillation 19.

In order to mitigate the induced sustained oscillation 194 described above, when high pressure is detected, the controller 120 operates the motor 94 such that a rate of change in speed of the motor 94 is limited in order to dampen oscillations in the hydraulic system 60. The controller 120 may calculate a first rate of change of pressure the first hydraulic pressure transducer 146 and a second rate of change of the second hydraulic pressure transducer 148. The controller 120 may also be configured to calculate an average rate of change of the first rate of change of pressure and the second rate of change of pressure.

When the controller 120 detects or determines that a large positive slope is present in the signals from the first and second hydraulic pressure transducers 146, 148, it can be assumed that a high pressure will be reached and an oscillation will be induced. For example, a large positive slope may be detected or determined based on a comparison of the first rate of change of pressure, the second rate of change of pressure and/or the average rate of change to a predetermined rate of change of pressure. When the first rate of change of pressure, the second rate of change of pressure, and/or the average rate of change of pressure exceeds the predetermined rate of pressure, the controller 120 may determine that a large positive slope is present. The predetermined rate of pressure may be stored in memory of the controller 120 and may be adjustable.

The controller 120 may also calculate a rate of change in speed of the motor 94 over an interval of time. The controller 120 may compare the rate of change in speed to a predetermined rate of change in speed and the controller 120 may be configured to limit the rate of change in speed by the predetermined rate of change in speed based on the comparison. For example, when a large positive slope is detected and in response to the rate of change of speed for the motor 94 exceeding the predetermined rate of speed, the controller 120 may be configured to limit the rate of change in the speed of the motor 94 by the predetermined rate to prevent large oscillations from starting. In some embodiments, the controller 120 may also be configured to limit the speed of the motor 94 by a predetermined operating speed. In other embodiments, the controller 120 may be configured to adjust the target parameter of the motor 94 based on the first rate of change of pressure, the second rate of change of pressure, and/or the average rate of change of pressure.

In addition, the pressure measurement provided by the first and second hydraulic pressure transducers 146, 148 allows the controller 120 to make adjustment on-the-fly to compensate for different weights, loads, and the like (e.g., a heavy patient v. a light patient). Here, upon receiving signals from the first and second hydraulic pressure transducers 146, 148 representing the hydraulic pressure at the cap end chamber 84*a* and/or the rod end chamber 84*b* of the hydraulic cylinder 80, the controller 120 is able to determine if the pump 92 or the motor 94 is failing or otherwise performing differently than is expected based on the power and RPM being applied to the motor 94 and the corresponding amount of pressure the pump 92 is producing.

The controller 120 is programmed to eliminate "bouncing" effect while lowering the cot 10 toward the ground by monitoring pressure in the hydraulic system 60, and controlling the motor 94 of the pump 92 to limit its ability to change speed too quickly, as noted above. In some embodiments, the controller 120 selects and/or changes between different motor curves for operating the pump 92 motor 94 based on the pressure measured by the first and second hydraulic pressure transducers 146, 148 in the hydraulic system 60. Here too, in some embodiments, the controller 120 may be programmed to raise the cot 10 up from the ground at effectively the same speed irrespective of the load on the cot 10 (e.g., just as fast for a heavy patient as a lighter patient). To this end, the controller 120 can drive the motor 94 in different ways depending on the load sensed via the first and second hydraulic pressure transducers 146, 148.

For example, if relatively high pressure is sensed via the first and second hydraulic pressure transducers 146, 148, the controller 120 determines that the load is relatively heavy and drives the motor 94 of the pump 92 in a first mode in response; and if a relatively low pressure is sensed via the first and second hydraulic pressure transducers 146, 148, the controller 120 determines that the load is relatively light and drives the motor 94 of the pump 92 in a second mode in response. Here, operating in the first mode with a heavy patient, or operating in the second mode with a lighter patient, nevertheless results in movement of the litter relative to the base 18 at a predetermined rate irrespective of a weight of a patient supported on the litter. Stated differently, a heavier patient is moved relative to the ground at a substantially similar speed as a lighter patient.

The controller 120 may be configured to determine a target parameter for the motor 94 based on the signals from the first and second hydraulic pressure transducers 146, 148. The target parameter may correspond to a speed of the motor 94. The controller 120 may drive the motor 94 at the target parameter to effect movement of the litter relative to the base 18 at the predetermined rate. The controller 120 may also be configured to determine a target parameter for a valve, such as the valve 116, for one of the conduits, such as the third hydraulic conduit, based on one or more of the signals from the first and second hydraulic pressure transducers 146, 148. For example the target parameter may correspond to a flowrate for the valve 116 or a degree of opening/closing for the valve 116 necessary to achieve a desired flowrate that results in movement of the litter relative to the base 18 at the predetermined rate.

In order to move the litter relative to the base 18 at the predetermined rate, the controller 120 in some instances may only adjust the target parameter for the motor 94. In other instances, the controller 120 may only adjust the target parameter for one or more of the valves, such as the valve 116. Yet in other instances, the controller 120 may adjust the target parameter for the motor 94 and also the target parameter for one or more valves. Further, control of the fluid through the hydraulic circuit 90 may be achieved by controlling the flow rate or opening or closing the flow using the various valves noted above that are shown and/or described.

Figure 12:
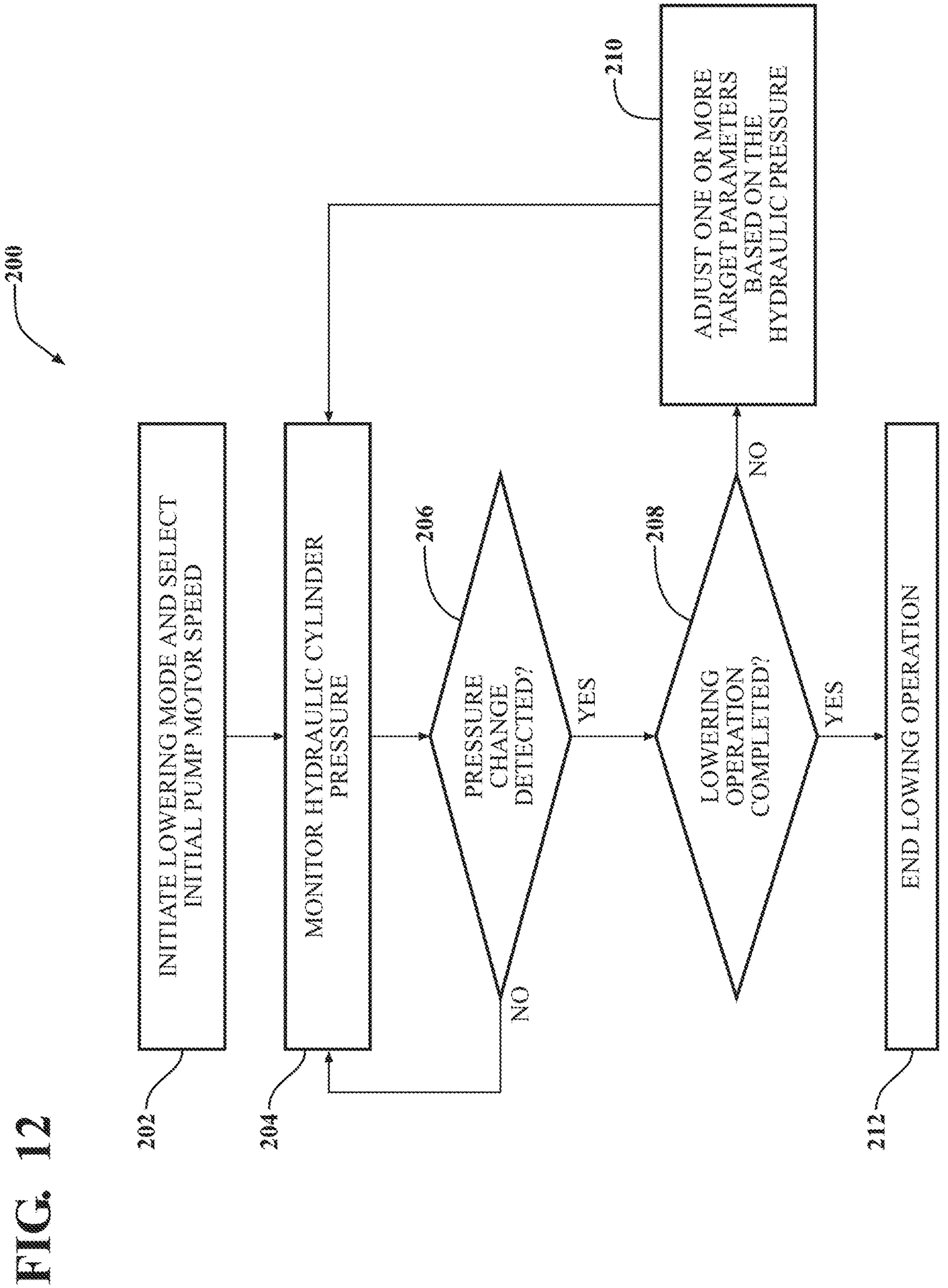
FIG. 12 is a flowchart illustrating an algorithm executed by the control system for operating the hydraulic system of the patient support apparatus in the lowering mode and hydraulic oscillation dampening via control with pressure feedback.

FIG. 12 includes a flow chart of method 200 illustrating an algorithm included with the hydraulic control lift software module 144 and performed by the processor 140 when executing the hydraulic control lift software module 144 for operating the hydraulic system 60. Each method step may be performed independently of, or in combination with, other method steps. Portions of the methods may be performed by any one of, or any combination of, the components of the control system 82. As will be appreciated from the subsequent description below, this method 200 merely represents an exemplary and non-limiting sequence of blocks to describe operation of the control system 82 and is in no way intended to serve as a complete functional block diagram of the control system 82.

In method step 202, the controller 120 initiates a lowering mode operation and operates the hydraulic system 60 to lower the frame towards the base 18. For example, in some embodiments, the controller 120 may receive a signal from an operator via user interface controls 120*a* to initiate a lowering operation. Upon receiving the operator signal, the controller 120 selects an initial speed for the motor 94 and operates the motor 94 of the pump 92 at the selected speed to initiate the lowering of the frame 12 towards the base 18.

In method step 204, the controller 120 receives signals from the first and second hydraulic pressure transducers 146, 148 to establish an initial hydraulic pressure value within the hydraulic cylinder 80 as hydraulic system 60 is initially operated to lower the frame 12. The controller 120 continues to monitor the first and second hydraulic pressure transducers 146, 148 to detect changes in the hydraulic pressure within the hydraulic cylinder 80 during the lowering mode operation.

In method step 206, the controller 120 determines whether a change in the hydraulic pressure within the hydraulic cylinder 80 has occurred during the lowering operation. If a change in the hydraulic pressure within the hydraulic cylinder 80 has not occurred, the controller 120 continues to step 204 and monitors the signals from the first and second hydraulic pressure transducers 146, 148. If a change in the hydraulic pressure within the hydraulic cylinder 80 has occurred, the controller 120 proceeds to method step 208.

In method step 208, the controller 120 determines whether the lowering operation has been completed. For example, the controller 120 may receive one or more signals from sensors 124 to determine a height of the cot 10, and determine whether the lowing operation has been completed based on the determined height of the cot 10. If the controller 120 determines that the lowering operation is completed based on the height of the cot 10, the controller 120 proceeds to method step 212 and stops the operation of the motor 94 of the pump 92 to end the lowering operation. If the controller 120 determines that the lowing operation has not been completed, the controller 120 proceeds to method step 210.

In method step 210, the controller 120 adjusts one or more target parameters based on the hydraulic system 60 based on the determined hydraulic pressure being sensed within the hydraulic cylinder 80. For example, as previously discussed, the one or more target parameters may correspond to a speed of the motor 94. As such, the controller 120 may adjust the speed of the motor 94 based on the determined hydraulic pressure to continue the lowering operation. In another example, the one or more target parameters may correspond to a flowrate for one of the valves or a degree of opening/closing necessary to achieve the desired flowrate for a respective valve.

The controller 120 then proceeds to method step 204 to continue to monitor the signals from the hydraulic pressure transducers 146, 148 to detect changes in the hydraulic pressure within the hydraulic cylinder 80 and to continue the lowing operation. By adjusting the speed of the motor 94 based on the hydraulic pressure sensed within the hydraulic cylinder 80, the controller 120 is programmed to raise and lower the cot 10 at effectively the same speed irrespective of the patient weight load on the cot 10.

Further, it should be understood, in each instance above, where it is described that the controller 120 or sensor or other components are in communication, the communication may be achieved through hard wiring or via wireless communication.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

Further, although illustrated as discrete separate components, the various components may be assembled or integrated together into a single unit or multiple units. It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus for supporting patients of different weights, the patient transport apparatus comprising:

a base arranged for movement along a ground surface;

a litter comprising a patient support surface to support patients of different weights;

a lift mechanism to facilitate arranging the litter at different heights relative to the base between a plurality of lift configurations including a fully-retracted configuration and a fully-extended configuration, the lift mechanism including an actuator disposed in fluid communication with a pump driven by a motor;

a sensor configured to output a signal indicative of a magnitude of pressure in the actuator;

a user interface comprising an input control arranged for user engagement to operate the lift mechanism; and a controller disposed in communication with the motor, the sensor, and the user interface, the controller being configured to:

determine a target parameter for the motor based on the signal generated by the sensor, drive the motor at the target parameter to effect movement of the litter relative to the base in response to user engagement with the input control, and adjust operation of the motor while driving the motor based on changes occurring in the signal generated by the sensor to dampen hydraulic oscillation acting on the actuator.

2. The patient transport apparatus of claim 1, wherein the target parameter for the motor corresponds to a speed of the motor.

3. The patient transport apparatus of claim 1, wherein the actuator defines a cylinder supporting a piston coupled to a rod and arranged for movement along the cylinder; and wherein the lift mechanism includes:

a first hydraulic conduit and a second hydraulic conduit to enable the flow of hydraulic fluid between the cylinder and the pump by way of a first fluid path, and a third hydraulic conduit configured to selectively enable at least a portion of the hydraulic fluid output from a first end of the cylinder to bypass the pump and be redirected to a second end of the cylinder by way of a second fluid path.

4. The patient transport apparatus of claim 3, wherein the third hydraulic conduit includes a valve.

5. The patient transport apparatus of claim 4, wherein the controller is disposed in communication with the valve.

6. The patient transport apparatus of claim 5, wherein the controller is further configured to:

determine a valve target parameter for the valve based on the signal generated by the sensor, and actuate the valve at the valve target parameter to effect movement of the litter relative to the base in response to user engagement with the input control.

7. The patient transport apparatus of claim 6, wherein the controller is further configured to adjust operation of the valve while actuating the valve based on changes occurring in the signal generated by the sensor to dampen hydraulic oscillation acting on the actuator.

8. The patient transport apparatus of claim 7, wherein the controller is configured to:

drive the motor to operate the lift mechanism to move the litter away from the base supported on the ground surface, and actuate the valve to operate the lift mechanism to move the litter towards the base supported on the ground surface.

9. The patient transport apparatus of claim 6, wherein the valve is a proportional control valve; and wherein the valve target parameter corresponds to a flowrate of the proportional control valve.

10. The patient transport apparatus of claim 5, further comprising a motor sensor configured to output a motor signal representative of a load on the motor.

11. The patient transport apparatus of claim 10, wherein the motor sensor is a current sensor and the motor signal is representative of current drawn by the motor.

12. The patient transport apparatus of claim 11, wherein in response to current drawn by the motor exceeding a prescribed value, the controller is configured to close the valve to prevent the flow of hydraulic fluid between the first end of the cylinder and the second end of the cylinder via the third hydraulic conduit.

13. The patient transport apparatus of claim 5, wherein the valve is further defined as a first valve;

wherein at least one of the first hydraulic conduit and the second hydraulic conduit includes a second valve disposed in communication with the controller; and wherein the controller is configured to close the second valve when the first valve is opened such that the hydraulic fluid bypasses the pump.

14. The patient transport apparatus of claim 1, wherein the actuator defines a cylinder supporting a piston coupled to a rod and arranged for movement along the cylinder between a first end and a second end.

15. The patient transport apparatus of claim 14, wherein the sensor is defined as a first sensor being connected to the first end of the cylinder and being configured to output a signal indicative of a magnitude of pressure in the cylinder at the first end; and further comprising a second sensor disposed in communication with the controller and being connected to the second end of the cylinder, the second sensor being configured to output a signal indicative of a magnitude of pressure in the cylinder at the second end.

16. The patient transport apparatus of claim 15, wherein the controller is further configured to:

calculate an average rate of change of the signal output from the first sensor and the signal output from the second sensor, and adjust operation of the motor based on the average rate of change of the signal output from the first sensor and the signal output from the second sensor.

17. The patient transport apparatus of claim 14, wherein the pump of the lift mechanism is configured for operation between:

a first pump mode to direct hydraulic fluid across a first fluid path to the first end of the cylinder, and a second pump mode to direct hydraulic fluid across a second fluid path to the second end of the cylinder.

18. The patient transport apparatus of claim 17, wherein the lift mechanism further includes a piloted check valve interposed in fluid communication along the first fluid path between the first end of the cylinder and the pump, the piloted check valve having a pilot line disposed in fluid communication with the second fluid path.

19. The patient transport apparatus of claim 18, wherein the controller is further configured to:

drive the motor to operate the pump in the second pump mode so as to move the litter at a predetermined rate towards the fully-retracted configuration in response to user engagement with the input control, the predetermined rate being substantially the same for patients of different weights supported on the litter, and adjust operation of the motor while driving the motor to operate the pump in the second pump mode to maintain the predetermined rate as the litter moves towards the fully-retracted configuration to compensate for changes in load occurring across the pump as pressurized hydraulic fluid flows to the pump from the first end of the cylinder across the piloted check valve.

20. The patient transport apparatus of claim 17, further comprising a poppet valve interposed in fluid communication along at least one of the first fluid path and the second fluid path between at least one of the first end of the cylinder and the second end of the cylinder and the pump.

* * * * *